（12）United States Patent
Saito et al.

(10) Patent No.: US 7,477,588 B2
(45) Date of Patent: Jan. 13, 2009

(54) APPARATUS FOR AND METHOD OF RECORDING AND REPRODUCING HOLOGRAMS

(75) Inventors: Kimihiro Saito, Saitama (JP); Hisayuki Yamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 11/069,986

(22) Filed: Mar. 3, 2005

(65) Prior Publication Data

US 2005/0213470 A1    Sep. 29, 2005

(30) Foreign Application Priority Data

Mar. 5, 2004    (JP) .............................. 2004-062732

(51) Int. Cl.
*G11B 7/00* (2006.01)
(52) U.S. Cl. ........................... 369/103; 359/10; 359/11; 359/30; 369/109.01
(58) Field of Classification Search ................... 359/22, 359/2, 35, 10, 11, 30; 369/112.02, 103, 109.01, 369/109

See application file for complete search history.

(56) References Cited

U.S. PATENT DOCUMENTS 5,949,558 A * 9/1999 Psaltis et al. ................... 359/22

7,221,760 B2 * 5/2007 Javidi et al. ..................... 359/2
2005/0025026 A1 * 2/2005 Hirai ..................... 369/112.02

OTHER PUBLICATIONS

Barbastathis G., Levene M., Psaltis D.; Shift Multiplexing with Spherical Reference Waves, May 10, 1996/ vol. 35, No. 14/ applied optics.*

Markov V.B., Millerd J.E., Trolinger J.D.; Multilayer Holographic Data Multiplexing with Random Encoded Reference Beam, Jul. 1999/vol. 3864/SPIE.*

* cited by examiner

*Primary Examiner*—Thang V Tran
*Assistant Examiner*—Mark Fischer
(74) *Attorney, Agent, or Firm*—Oblon, Spivak, McClelland, Maier & Neustadt, P.C.

(57) ABSTRACT

The number M of a plurality of multiplexed recording mediums to be recorded in a projected area S on the surface of a recording medium satisfies the equation (1') where n represents the refractive index of the recording medium, λ the wavelength in vacuum of light used to record and reproduce information, L the thickness of the recording medium, $\pm NA_R$ the range of an angular spectrum in air of a reference beam, $\pm NA_S$ the range of an angular spectrum in air of a reproduced beam applied to a light detector, S the projected area of a recording region to be recorded in one recording cycle onto the surface of the recording medium, N the number of bits to be recorded in one recording cycle, and Z the signal vs. signal noise ratio as a target ratio (Z=3).

6 Claims, 6 Drawing Sheets

BACKGROUND ART

BACKGROUND ART

APPARATUS FOR AND METHOD OF RECORDING AND REPRODUCING HOLOGRAMS

BACKGROUND OF THE INVENTION

The present invention relates to an apparatus for and a method of recording and reproducing holograms by recording a light interference intensity as a refractive index change when a plurality of light beams emitted from one light source are caused to interfere with each other in a recording medium, and reading the recorded information by detecting reproduced light that is generated when a portion (reference beam) of the plural light beams is applied to the recording medium.

FIG. 7 of the accompanying drawings is a schematic perspective view of a first example of a hologram recording and reproducing system.

The hologram recording and reproducing system shown in FIG. 7 is based on angle-multiplexing, and includes a laser beam source (not shown), a beam splitter 10, an LCD 11, a recording medium 12, a CCD 13, lenses 14, 15, and mirrors 16, 17.

For recording information in recording medium 12, a laser beam emitted from the laser beam source is divided by the beam splitter 10 into two beams, and one of the beams passes through the beam splitter 10 and is applied to the LCD 11. The laser beam is modulated into a bit pattern displayed by an SLM (spatial light modulator) of the LCD 11, and applied to the recording medium 12.

The other laser beam divided by the beam splitter 10, which is referred to as a reference beam, is reflected by the mirrors 16, 17 and applied laterally to the recording medium 12. In the recording medium 12, therefore, the two laser beams interfere with each other, and the interference intensity is recorded as a refractive index change.

In the angle-multiplexing system, the mirror 17 is rotated to change the angle of the interference beam to record different bit patterns on the SLM.

The hologram recording and reproducing system shown in FIG. 7 is disadvantageous in that the reference beam is applied at the same angle as the angle used for recording the bit patterns to reproduce the bit patterns on the CCD 13, and the recording medium is fixed in position, making it difficult to record and reproduce a large amount of information.

FIG. 8 of the accompanying drawings is a schematic perspective view of a second example of a hologram recording and reproducing system. hologram recording and reproducing system shown in FIG. 8 is based on shift-multiplexing, and includes a laser beam source (not shown), a beam splitter 20, an LCD 21, a recording medium 22, a CCD 23, lenses 24, 25, 26, and a mirror 27.

For recording information in recording medium 22, a laser beam emitted from the laser beam source is divided by the beam splitter 20 into two beams, and one of the beams passes through the beam splitter 20 and is applied to the LCD 21 by the reflection of the mirror 27. The laser beam is modulated into a bit pattern displayed by an SLM (spatial light modulator) of the LCD 21, and applied through the lens 24 to the recording medium 22.

The reference beam, which is the other laser beam divided by the beam splitter 20, is applied through the lens 25 laterally to the recording medium 22. In the recording medium 22, therefore, the two laser beams interfere with each other, and the interference intensity is recorded as a refractive index change.

The recording medium 22 is in the form of a disk, and is rotated by a rotating mechanism (not shown) to displace the recording position. In this system, a spherical wave produced by the lens 25 is used as the reference beam, and the recording medium 22 is rotated to record and reproduce different bit patterns for making it possible to record a large amount of information.

Though the hologram recording and reproducing system shown in FIG. 8 can record and reproduce different bit patterns at small spaced intervals in the rotational direction of the disk, without cross-talk, it is necessary to provide large spaced intervals for shifts in the radial direction of the disk in order to eliminate cross-talk, posing limitations on the recording density for information. This problem is addressed in "Shift multiplexing with spherical reference waves", Barbastathis G., Levene M., Psaltis D., Appl. Opt., Vol. 35 (1996), p. 2403, for example.

In order to solve the problem of the above system, there has been proposed a system wherein a reference beam which passes through a diffuser, e.g., a frosted glass panel, to have its phase randomized is used to eliminate anisotropy for making it possible to record and reproduce different bit patterns at small spaced intervals for shifts in the rotational, radial, and transverse directions of the disk. This technique is disclosed in "Multilayer holographic data multiplexing with random encoded reference beam", Markov, V. B., Millerd, J. E., Trolinger, J. D., SPIE Vol. 3864, p. 100, for example.

FIG. 9 of the accompanying drawings shows the manner in which a reference beam 32 which passes through a diffuser 31 to have it phase randomized is applied to a recording medium 33 in the above hologram recording and reproducing system.

The above document refers to the need for record and reproduce multiplexed data at spaced shift intervals greater than the speckle size of the reference beam so that the reproduced signal vs. noise ratio will meet the requirements of the above system which employs the diffuser. However, since it is not clear how much the spaced shift intervals should be greater than the speckle size of the reference beam for recording and reproducing multiplexed data, it is not easy to determine spaced shift intervals and multiplexed densities in actual system designs. Therefore, there is difficulty putting the proposed system into practical use.

SUMMARY OF THE INVENTION

It is therefore an object of the present invention to provide an apparatus for and a method of recording and reproducing holograms while making it possible to easily and appropriately determine the number of holograms to be multiplexed which is required to achieve a target signal vs. noise ratio in a system employing a diffuser, thereby realizing desired characteristics.

To achieve the above object, there is provided in accordance with the present invention an apparatus for recording and reproducing holograms, including a recording system for recording a light interference intensity as a refractive index change when a plurality of light beams emitted from one light source are caused to interfere with each other in a recording medium, a reproducing system for reading information recorded in the recording medium by detecting, with a light detector, a reproduced beam that is generated when a reference beam as a portion of divided light beams is applied to the recording medium, and a medium control system for moving the recording medium for recording and reproducing a plurality of interference patterns when information is recorded on and reproduced from the recording medium. The reference beam applied to the recording medium has an angular spectrum providing an RMS error which is 0.18 or more of the wavelength when the phase of the reference beam is fitted by a polynomial of degree four. The number M of a plurality of multiplexed recording mediums to be recorded in a projected area S on the surface of the recording medium satisfies the following equation (1):

$$M \le \frac{S \cdot L \cdot NA_R^3 NA_S}{0.3 Z^2 n \lambda^3 N} \quad (1)$$

where n represents the refractive index of the recording medium, λ the wavelength in vacuum of light used to record and reproduce the information, L the thickness of the recording medium, $\pm NA_R$ the range of an angular spectrum in air of the reference beam, $\pm NA_S$ the range of an angular spectrum in air of the reproduced beam applied to the light detector, S the projected area of a recording region to be recorded in one recording cycle onto the surface of the recording medium, N the number of bits to be recorded in one recording cycle, and Z the signal vs. signal noise ratio as a target ratio.

There is also provided in accordance with the present invention a method of recording and reproducing holograms on and from a recording medium, using a recording system for recording a light interference intensity as a refractive index change when a plurality of light beams emitted from one light source are caused to interfere with each other in a recording medium, a reproducing system for reading information recorded in the recording medium by detecting, with a light detector, a reproduced beam that is generated when a reference beam as a portion of divided light beams is applied to the recording medium, and a medium control system for moving the recording medium for recording and reproducing a plurality of interference patterns when information is recorded on and reproduced from the recording medium. The reference beam applied to the recording medium has an angular spectrum providing an RMS error which is 0.18 or more of the wavelength when the phase of the reference beam is fitted by a polynomial of degree four. The number M of a plurality of multiplexed recording mediums to be recorded in a projected area S on the surface of the recording medium satisfies the following equation (1):

$$M \le \frac{S \cdot L \cdot NA_R^3 NA_S}{0.3 Z^2 n \lambda^3 N} \quad (1)$$

where n represents the refractive index of the recording medium, λ the wavelength in vacuum of light used to record and reproduce the information, L the thickness of the recording medium, $\pm NA_R$ the range of an angular spectrum in air of the reference beam, $\pm NA_S$ the range of an angular spectrum in air of the reproduced beam applied to the light detector, S the projected area of a recording region to be recorded in one recording cycle onto the surface of the recording medium, N the number of bits to be recorded in one recording cycle, and Z the signal vs. signal noise ratio as a target ratio.

With the apparatus for recording and reproducing holograms according to the present invention, since the multiplexing number is determined based on the above equation (1), it is guaranteed that a signal vs. noise ratio SNR due to crosstalk from another recorded multiplexed bit pattern when a certain bit pattern is reproduced will be Z or higher (e.g., a linear level of 3 or more). Therefore, there is provided a highly reliable, large-capacity, and high-transfer-rate hologram storage system.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
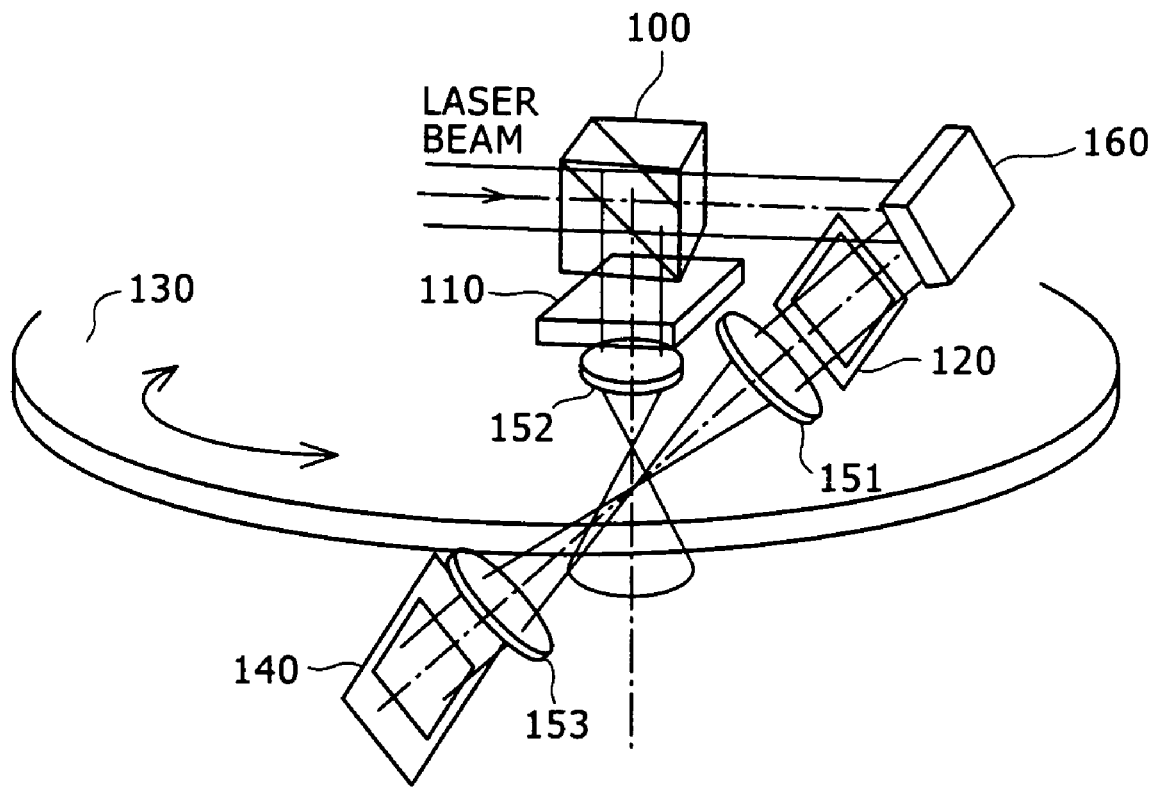
FIG. 1 is a schematic perspective view of a hologram recording and reproducing system according to an embodiment of the present invention.

An apparatus for and a method of recording and reproducing holograms according to the present invention are implemented as a system for recording a light interference intensity as a refractive index change when a plurality of light beams emitted from one light source are caused to interfere with each other in a recording medium, and reading the recorded information by detecting a reproduced beam that is generated when a portion (reference beam) of divided light beams is applied to the recording medium. In the system, a plurality of interference patterns are recorded on and reproduced from the recording medium which is in the form of a flat plate while it is being translated.

Particularly, the system performs phase-correlated multiplex recording, or speckle multiplex recording, where the angular spectrum of the reference beam applied to the recording medium provides an RMS error which is 0.18 times the wavelength in the recording medium when the phase of the reference beam is fitted by a polynomial of degree four. In the system, the number M of a plurality of multiplexed recording mediums to be recorded in a projected area S on the surface of the recording medium satisfies the following equation (1'):

$$M \le \frac{1}{2.7} \frac{SLNA_R^3 NA_S}{n \lambda^3 N} \quad (1')$$

where n represents the refractive index of the recording medium, λ the wavelength in vacuum of light used to record and reproduce the information, L the thickness of the recording medium, $\pm NA_R$ the range of an angular spectrum in air of the reference beam, $\pm NA_S$ the range of an angular spectrum in air of the reproduced beam applied to a light detector, S the projected area of a recording region to be recorded in one recording cycle onto the surface of the recording medium, N the number of bits to be recorded in one recording cycle, and the signal vs. signal noise ratio SNR as a target ratio is Z=3.

$$M \leq \frac{S \cdot L \cdot NA_R^3 NA_S}{0.3Z^2 n \lambda^3 N} \quad (1')$$

The system according to the present embodiment employs the equation (1') where the signal vs. noise ratio SNR is Z=3. A general equation (1) where the signal vs. noise ratio SNR is represented by Z is given as follows:

$$M \leq \frac{S \cdot L \cdot NA_R^3 NA_S}{0.3Z^2 n \lambda^3 N} \quad (1)$$

According to the equations (1'), (1), if the wavelength λ=0.532 μm, the cross-sectional area of the holograms is 0.5 mm×0.5 mm, the thickness L of the recording medium is L=1 mm, the refractive index n=2.24, $NA_R=NA_S=0.5$, the number N of bits per page=256×256, and SNR>3, then the multiplexing number M is 261 or less.

Specifically, √261 holograms can be recorded in 0.5 mm, and can be recorded and reproduced at a spaced interval of 0.5/sqrt(261)=30 μm in one direction.

With the above arrangement, it is that a signal vs. noise ratio SNR due to cross-talk from another recorded multiplexed bit pattern when a certain bit pattern is reproduced will be 3 or more. Therefore, there is provided a highly reliable, large-capacity, and high-transfer-rate hologram storage system.

First Embodiment

FIG. 1 shows in schematic perspective a hologram recording and reproducing system according to an embodiment of the present invention.

As shown in FIG. 1, the hologram recording and reproducing system includes a laser beam source (not shown), a beam splitter 100, a diffuser 110, an LCD 120, a recording medium 130, a CCD (Charge-Coupled Device) 140, lenses 151, 152, 153, and a mirror 160.

For recording information in recording medium 130, a laser beam emitted from the laser beam source is divided by the beam splitter 100 into two beams, and one of the beams passes through the beam splitter 100 and is reflected by the mirror 160 and applied to the LCD 120. The laser beam is modulated into a bit pattern displayed by an SLM (Spatial Light Modulator) of the LCD 120, and applied through the lens 151 to the recording medium 130.

A reference beam, which is the other laser beam divided by the beam splitter 100, passes through the diffuser 110 and is applied through the lens 152 to the recording medium 130. At this time, an interference pattern of the two laser beams is recorded as a refractive index change in the recording medium 130.

The recording medium 130 is in the form of a disk, and is rotated by a rotating mechanism (not shown). Optical systems are moved radially of the recording medium 130 to record different bit patterns displayed by the SLM while displacing the recording position on the recording medium 130.

For reproducing the recorded information, only the reference beam is applied to the recording medium 130. At this time, a bit pattern which is recorded in the position on the recording medium 130 to which the reference beam is applied is imaged by the CCD 140, thereby reproducing the recorded information.

In the hologram recording and reproducing system thus constructed, it is necessary to estimate how complex bit patterns to be recorded and reproduced are and at what spaced intervals the bit patterns can be recorded and reproduced on the disk without cross-talk.

Figure 2:
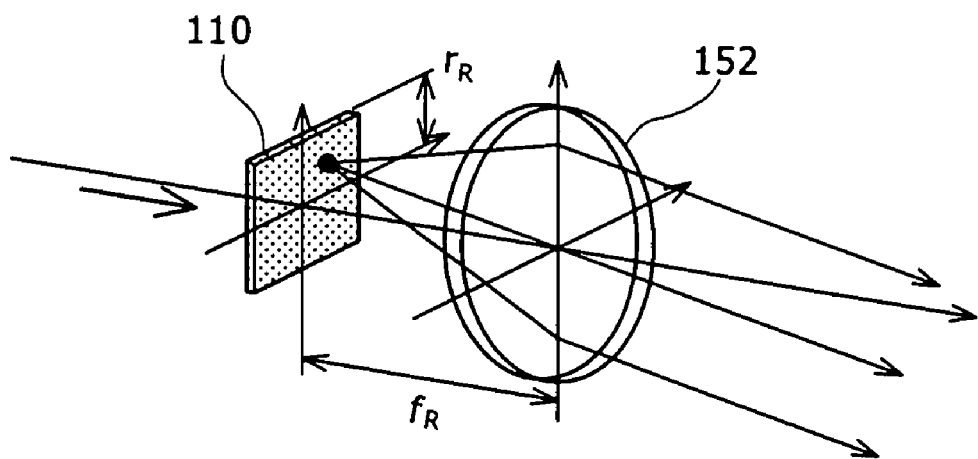
FIG. 2 is a perspective view showing the layout of a diffuser and a lens through which a reference beam passes toward a recording medium in the hologram recording and reproducing system shown in FIG. 1.

First, optical system parameters are defined. FIG. 2 shows in perspective the layout of the diffuser 110 and the lens 152 through which the reference beam passes toward the recording medium 130.

The diffuser 110 is disposed in a position which is spaced from the lens 152 by a distance that is equal to the focal length of the lens 152. Immediately after a laser beam passes through the diffuser 110, the diffused rays travel as coherent light, i.e., interfere with each other. The diffuser 110 is considered as a device having a plurality of point light sources arranged at different positions on a diffuser surface.

If a value produced by dividing the radius rR of the diffuser 110 by the focal length fR of the lens 152 is represented by $\pm NA_R$, then the reference beam applied to the recording medium 130 is a collection of plane waves having an angular spectrum $\pm NA_R$ (sine function, the sine of an angle will hereinafter referred to as "angle").

Figure 3:
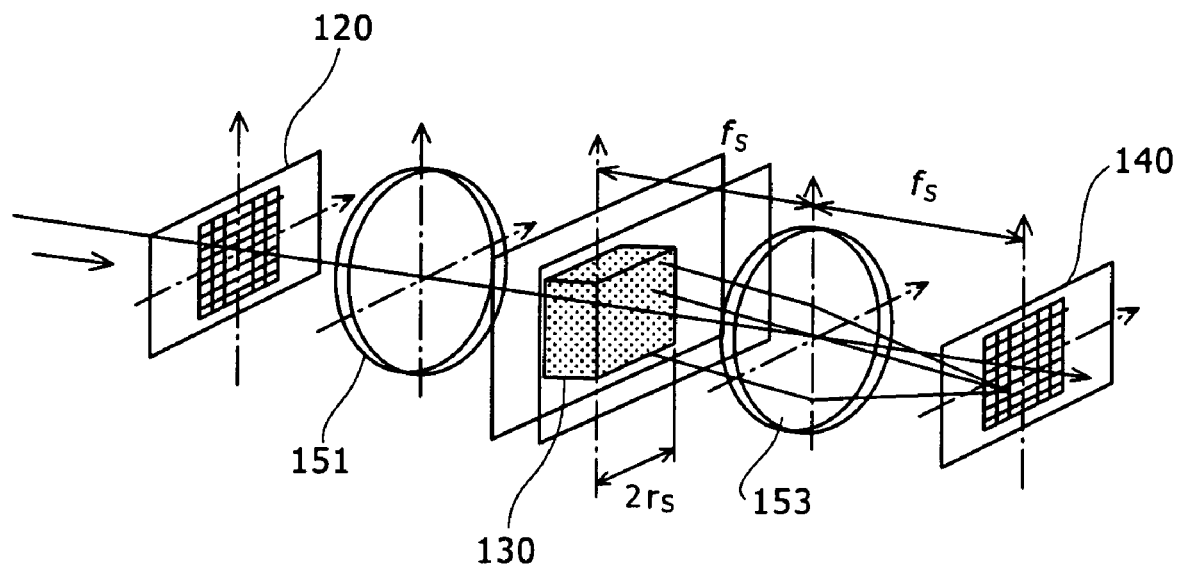
FIG. 3 is a perspective view of an optical system for applying bit patterns to a recording medium and an optical system for projecting bit patterns from the recording medium onto a CCD in the hologram recording and reproducing system shown in FIG. 1.

FIG. 3 shows in perspective an optical system for applying bit patterns to the recording medium 130 and an optical system for projecting bit patterns from the recording medium 130 onto the CCD 140.

It is assumed that when one hologram in the recording medium 130 is projected onto the surface of the recording medium 130, the hologram has a radius rS. The area of one hologram projected onto the surface of the recording medium 130 is represented by the following equation (2):

$$s = (2r_s)^2 \quad (2)$$

It is assumed that the focal length of the lens 153 is represented by fs. Parallel light rays emitted from a hologram produce light spots on the CCD 140. If diffracted spots are a distribution of Sinc functions, then the size of one bit in the CCD 140 needs to be $\lambda f_s/2r_s$ or greater. It is assumed that detection units of the CCD 140 are spaced at intervals $K_S\{(\lambda f_s/2r_s)\}$, $K_S \geq 1$, and that parallel light rays emitted from a hologram have an angular spectrum $\pm NA_S$ in the range where the bit pattern detection surface of the CCD 140 is irradiated. At this time, the total number of bits in a bit pattern is expressed by the following equation (3):

$$N = \left(4 \frac{NA_S}{K_S} \frac{r_S}{\lambda}\right)^2 \quad (3)$$

It is assumed that the size of the SLM 120, the displayed bit interval, and the focal lengths of the lenses are designed such that the bit positions are mapped onto the CCD 140 and the light applied from the bits on the SLM 120 to the recording medium 130 sufficiently covers the hologram region.

It is assumed that the recording medium 130 ideally has a refractive index distribution proportional to light intensities in the recording medium 130 when information is to be recorded therein. If the recording reference beam in the recording medium 130 is represented by W~(x, y, z) and the information beam in the recording medium 130 by S~(x, y, z), then the interference intensity is expressed by the equation (4-1) shown below. The refractive index distribution, which contributes to the recording and reproducing of information in the recording medium 130, is expressed by the equation (4-2) shown below. The symbol "~" placed over some alphabetical letters in the equations are indicated as the superscript "~" in the description.

In the equation (4-2), K represents sensitivity. |S~|2 will not be considered here. Reproduced light rays A~(x, y, z) generated at the respective points when the reproducing reference beam R~(x, y, z) is applied are expressed by the equation (4-3) shown below (the conjugate reproduced beam is ignored).

$$|\tilde{W}+\tilde{S}|^2 = |\tilde{W}|^2 + |\tilde{S}|^2 + \tilde{W} \cdot \tilde{S} + \tilde{S} \cdot \tilde{W} \qquad (4\text{-}1)$$

$$\Delta n = K(\tilde{W} \cdot \tilde{S} + \tilde{S} \cdot \tilde{W}) \qquad (4\text{-}2)$$

$$\tilde{A} = i\frac{K}{n}\tilde{W}^*\tilde{S}\tilde{R} \qquad (4\text{-}3)$$

Figure 4:
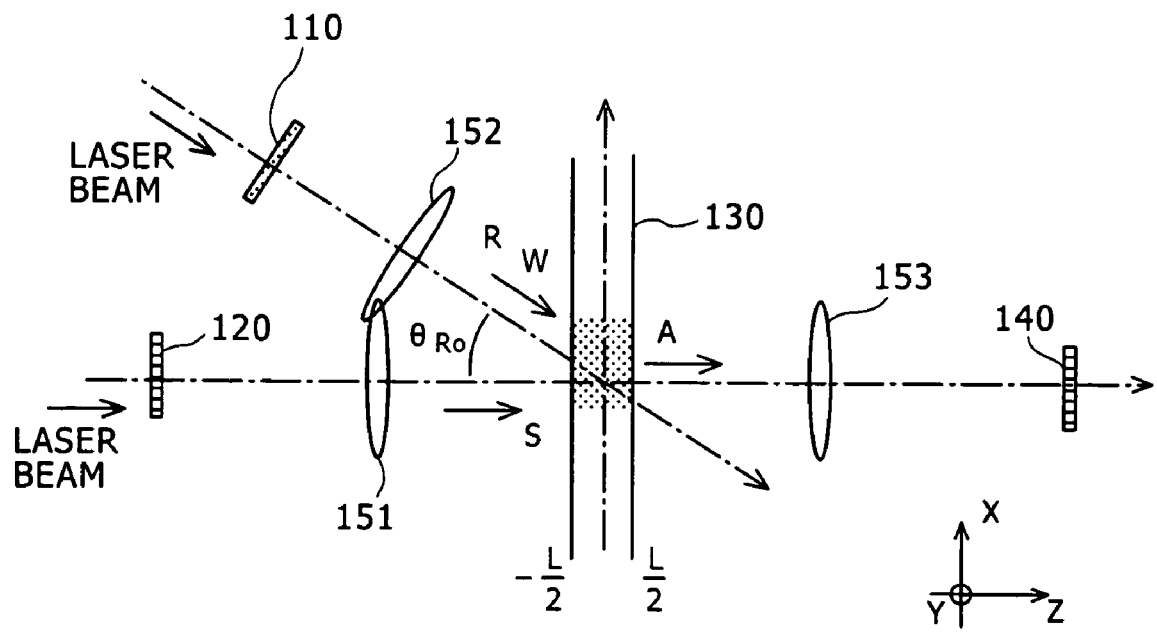
FIG. 4 is a view showing a coordinate system of the optical systems in the hologram recording and reproducing system shown in FIG. 1.

A coordinate system shown in FIG. 4 is used for calculations. The reference beam is represented by a collection of plane waves having an amplitude represented by an angular function, and light rays emitted from a hologram is similarly represented by a collection of plane waves having an amplitude represented by an angular function (each plane wave is focused onto the CCD 140).

A point on the CCD 140 is represented by the angle of a plane wave that is applied to that point. Specifically, such a point is expressed by the following equations (5-1), (5-2):

$$\tilde{S}(r, z) = \int_{-\infty}^{+\infty} S(p) \cdot e^{ik_0\left(p \cdot r + \sqrt{n^2 - p^2} \cdot z\right)} \cdot dp; \qquad (5\text{-}1)$$

$$\tilde{W}(r, z) = \int_{-\infty}^{+\infty} W(p) \cdot e^{ik_0\left(p \cdot r + \sqrt{n^2 - p^2} \cdot z\right)} \cdot dp$$

$$\tilde{R}(r, z) = \int_{-\infty}^{+\infty} R(p) \cdot e^{ik_0\left(p \cdot r + \sqrt{n^2 - p^2} \cdot z\right)} \cdot dp; \qquad (5\text{-}2)$$

$$\tilde{A}(r, z) = \int_{-\infty}^{+\infty} A(p) \cdot e^{ik_0\left(p \cdot r + \sqrt{n^2 - p^2} \cdot z\right)} \cdot dp$$

where n indicates the refractive index of the recording medium 130. The amplitude of a light ray at a point P on the CCD 140 at the time the reproducing reference beam that is laterally shifted by $\epsilon$ with respect to the recording reference beam is expressed by the following equation (5-3):

$$A(p) = \int_{-L/2}^{L/2} \int_{-\infty}^{+\infty} W^*(p_1)S(p_2)R(p_3) \cdot \qquad (5\text{-}3)$$

$$e^{ik_0\left(p_3 \cdot \varepsilon + (-p_1 + p_2 + p_3 - p)r + \left(-\sqrt{n^2 - p_1^2} + \sqrt{n^2 - p_2^2} + \sqrt{n^2 - p_3^2} - \sqrt{n^2 - p^2}\right)z\right)}$$

$$\cdot dp_1 \, dp_2 \, dp_3 \, dr \, dz$$

where W, R represent the angular spectrums of the reference beams, which are functions with random phase, and S a bit pattern.

If the equation (5-3) is approximated by the following equation (5-4), then the following equation (6) is produced:

$$\sqrt{1 - p^2} \approx 1 - \frac{p^2}{2} \qquad (5\text{-}4)$$

$$A(p) = \int_{-\infty}^{+\infty} S(p - \Delta)W^*(p_3 - \Delta) \qquad (6)$$

$$R(p_3)L \cdot \text{Sinc}\left(\frac{xL}{n\lambda}\Delta \cdot (p - p_3)\right) \cdot e^{ik_0 p_3 \cdot \varepsilon} dp_3 d\Delta.$$

Since the reference beams have angular spectrums with random phase, $W^*(p_3-\Delta)R(p_3)$ in the equation (6) represents a random phase distribution if $\Delta$ is not zero. At this time, if the phase of the reference beams is uniformly distributed in the range from $-\pi$ to $\pi$, then the PMS value of the phase distribution, i.e., the wavefront aberration, is about $\lambda/2\sqrt{3}=0.288\lambda$ (rms).

Figure 7:
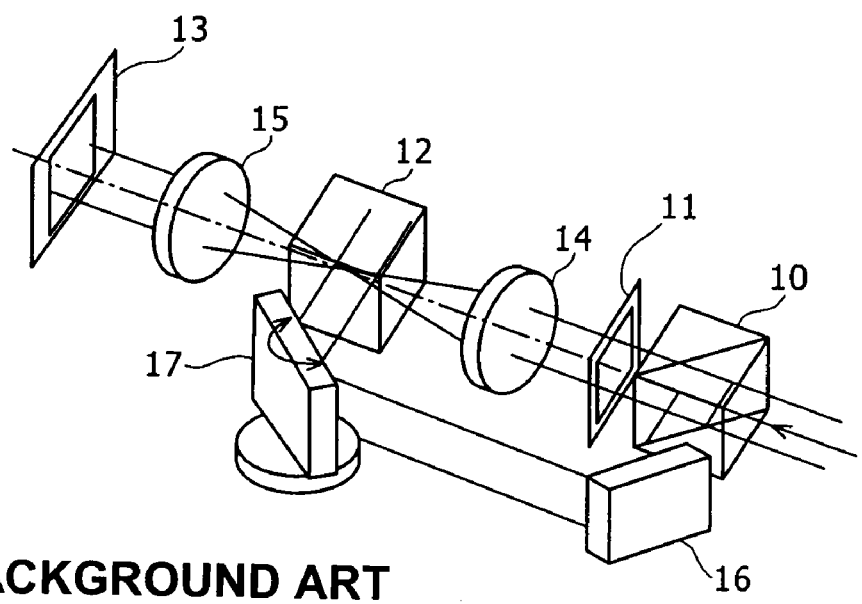
FIG. 7 is a schematic perspective view of a first example of a conventional hologram recording and reproducing system.
Figure 8:
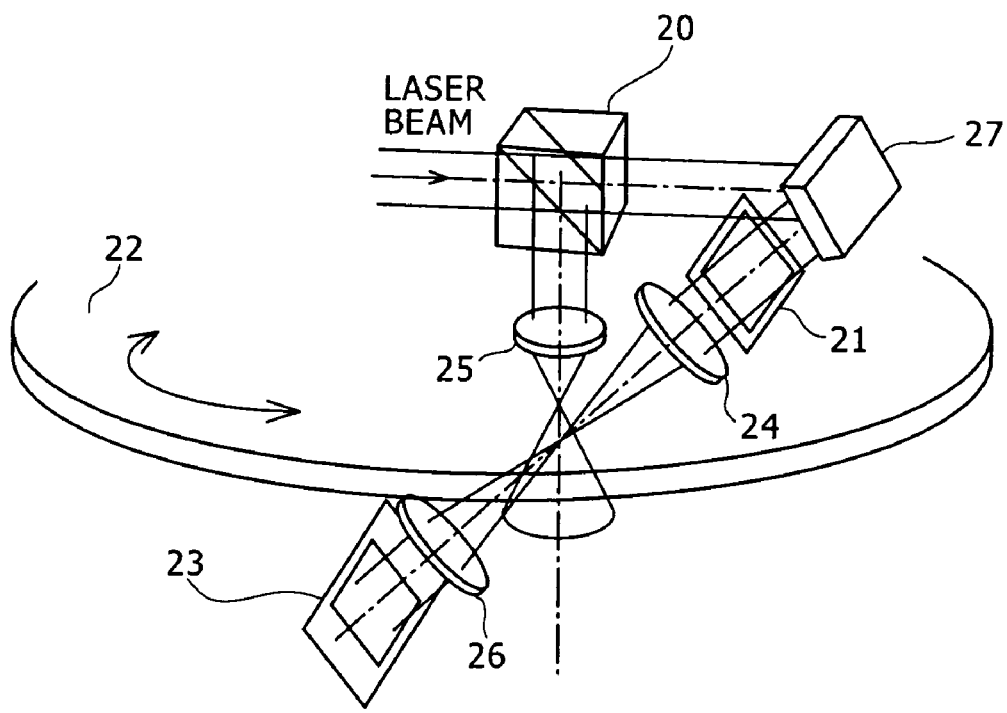
FIG. 8 is a schematic perspective view of a second example of a conventional hologram recording and reproducing system.
Figure 9:
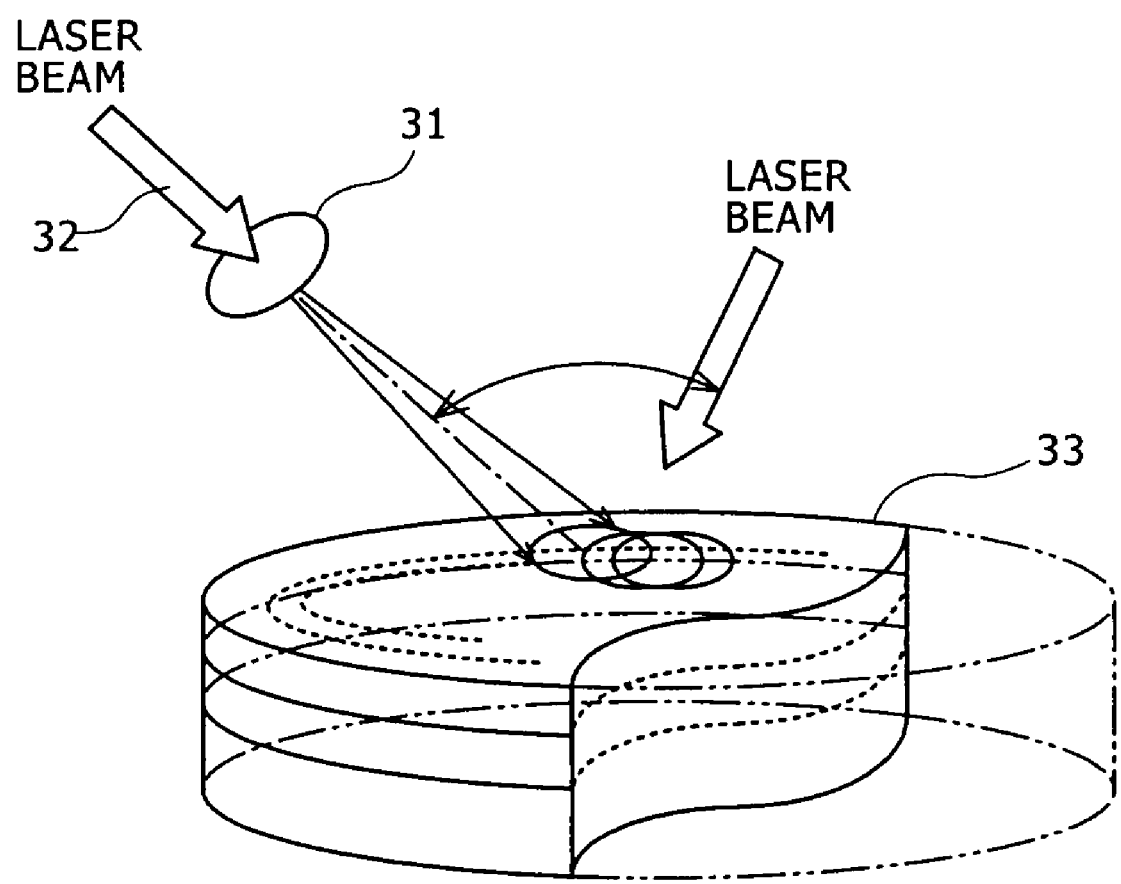
FIG. 9 is a schematic perspective view of a third example of a conventional hologram recording and reproducing system.

If the reference beams to be applied to the recording medium are not diffused, but constitute the plane wave as shown in FIG. 7 or the spherical wave as shown in FIG. 8, then a light beam having a phase distribution which is normally within $0.07\lambda$ (rms), called the Marshal criterion, from which defocus represented by polynomials up to the polynomial of degree four of the wavefront aberration, the spherical aberration, and coma are removed, is employed.

According to the present invention, therefore, the condition that the RMS value of an error of the phase distribution fitted by polynomials up to the polynomial of degree four is $0.18\lambda$ or more between $0.07\lambda$ and $0.288\lambda$ is used to define that the reference beams are random.

Based on the above condition, an example of calculations for deriving the equation (1) for determining an optimum multiplexing degree will be described below.

First, when the detection position on the CCD 140 is fixed and the recording medium 130 is moved (displacement $\epsilon$, $\Delta=0$), the amplitude of the reproduced beam is determined according to the equation (7) shown below. Since $\Delta=0$, $W^*(p_3)R(p_3)$ represents a distribution of phase=0. The amplitude is assumed to be uniform.

$$A(p) = L \cdot S(p) \int_{-\infty}^{+\infty} W^*(p_3)R(p_3)e^{ik_0 p_3 \cdot \varepsilon} dp_3 \qquad (7)$$

$$= C \cdot S(p)\text{Sinc}\left(2\pi\frac{NA_R}{\lambda}\varepsilon_x\right)\text{Sinc}\left(2\pi\frac{NA_R}{\lambda}\varepsilon_y\right)$$

therefore, when the recording medium 130 is moved by $\lambda/2NA_R$, no reproduced beam is seen, and another hologram can be recorded and reproduced in a multiplexed fashion at a position which has been shifted by $\lambda/2NA_R$ or more. According to the present system, a recording and reproducing interval is represented by $KR\{\lambda/2NA_R\}$, $KR \geq 1$ in the x and y directions. Using the radius $r_s$ of one hologram that is projected onto the surface of the recording medium 130, the number (multiplexing degree) M of multiplexed holograms recorded in the projected area is expressed by the equation (8) shown below. The recording density D of the present system is represented by (the total number of bits of a pit pattern)/(recording interval) 2, and expressed by the equation (9) shown below.

$$M = \left(4\frac{NA_R}{K_R}\frac{r_S}{\lambda}\right)^2 \qquad (8)$$

$$D = \left(16\frac{NA_R NA_S r_S}{K_R K_S \lambda^2}\right)^2. \qquad (9)$$

In view of cross-talk noise, the multiplexing degree M suffers limitations described below.

First, cross-talk is calculated by simulating the above equation (6) with a computer. M multiplexed holograms are recorded in the projected area of one hologram. If the reproducing reference beam is the same as the size of one hologram, then since the number of holograms which are responsible for cross-talk is M, the equation (1') can be written as the following equation (10):

$$A(p) = \qquad (10)$$

$$\sum_{j=1-\infty}^{M} \int S_j(p-\Delta)W^*(p_3-\Delta)R(p_3)L \cdot \text{Sinc}\left(\frac{\pi L}{n\lambda}\Delta \cdot (p-p_3)\right)dp_3 d\Delta$$

Because the resolution on the CCD 140 is determined, if the integral of the equation (10) is replaced with the sum of segments having an area of the resolution, then the equation (10) is changed to the equation (11) shown below. One side (converted into an angle) of the segments is $\Delta_0 = \lambda/2r_s$.

$$A(q_x\Delta_0, q_y\Delta_0) = \sum_{j=1}^{M}\sum_{m_x,m_y}\sum_{l_x,l_y} S_j \qquad (11)$$

$$((q_x-l_x)\Delta_0, (q_y-l_y)\Delta_0)\cdot W^*((m_x-l_x)\Delta_0, (m_y-l_y)\Delta_0)\cdot \ldots$$

$$R(m_x\Delta_0, m_y\Delta_0)\cdot \text{Sinc}\left(\frac{\pi L}{n\lambda}\Delta_0(l_x(q_x-m_x)+l_y(q_y-m_y))\right)$$

The equation (11) can be written as the equation (12) shown below:

$$A_{q_x,q_y} = \sum_{j=1}^{M}\sum_{m_x,m_y}\sum_{l_x,f_y} S_{j,q_x-l_x,q_y-l_y}\cdot W^*_{m_x-l_x,q_y-l_y}\cdot \qquad (12)$$

$$R_{m_x,m_y}\cdot \text{Sinc}\left(\frac{\pi L}{n\lambda}\Delta_0(l_x(q_x-m_x)+l_y(q_y-m_y))\right)$$

The range of the sum of m, l is limited by the range of spectrums S, W*, R. Specifically, the limitations are expressed by the following equations (13-1), (13-2), (13-3):

$$|q_x-l_x|, |q_y-l_y| \leq \frac{2NA_S r_S}{\lambda} = N_S, \qquad (13\text{-}1)$$

$$|m_x-l_x|, |m_y-l_y| \leq \frac{2NA_R r_S}{\lambda} = N_R, \qquad (13\text{-}2)$$

$$|m_x|, |m_y| \leq N_R \qquad (13\text{-}3)$$

W*, R represent complex numbers having an amplitude 1 and random phase. S represents a real number having an amplitude 1 or 0.

For the sake of brevity, a reproduced signal at a central bit position in a bit pattern will be considered ($q_x$, $q_y$=0). The equation (12) is converted into the equation (12-1) shown below.

$$A_{q_x,q_y} = \sum_{j=1}^{M}\sum_{m_x,m_y}\sum_{l_x,f_y} S_{j,q_x-l_x,q_y-l_y}\cdot W^*_{m_x-l_x,q_y-l_y}\cdot \qquad (12\text{-}1)$$

$$R_{m_x,m_y}\cdot \text{Sinc}\left(\frac{\pi L}{n\lambda}\Delta_0(l_x(q_x-m_x)+l_y(q_y-m_y))\right)$$

where $\Delta=0$, $\epsilon=0$ represent the amplitude of a reproduced beam of a bit to be read. The amplitude at one segment on the CCD 140 is expressed by the following equation (14):

$$\hat{A} = S_0 \sum_{m_x,m_y} W^*_{m_x,m_y}\cdot R_{m_x,m_y} = (2N_R)^2 \qquad (14)$$

Next, a stroke will be considered. In the equation (12), S·W*·R is considered to be a stochastic variable having an amplitude 1 or 0 and random phase, where the probability that the amplitude is 1 and the probability that the amplitude is 0 are the same. The sum of stochastic variables represents the amplitude of a noise beam. In the case where S·W*·R is 1 in the equation (12) and the equations (13-1), (13-2), (13-3) and the Sinc functions take a value 1 in the range of $\pm\pi$ and a value of 0 otherwise, the sum is simulated by the computer. The result is given as the equation (15) shown below. It is found that when c<0.2, the number of sums is given by the equation (16) shown below.

$$c = \frac{n\lambda}{L\cdot NA_R NA_S}, \qquad (15)$$

$$\hat{N} = 1.2c(4N_R N_S)^2 \qquad (16)$$

Figure 5A:
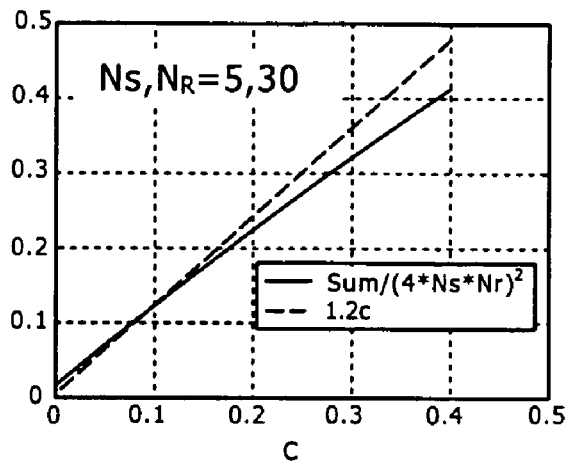
FIGS. 5A through 5C are diagrams showing the results of computer simulations for the hologram recording and reproducing system shown in FIG. 1.
Figure 5B:
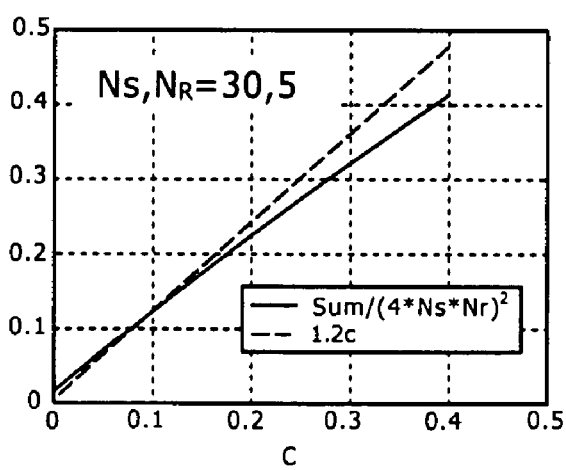
Figure 5C:
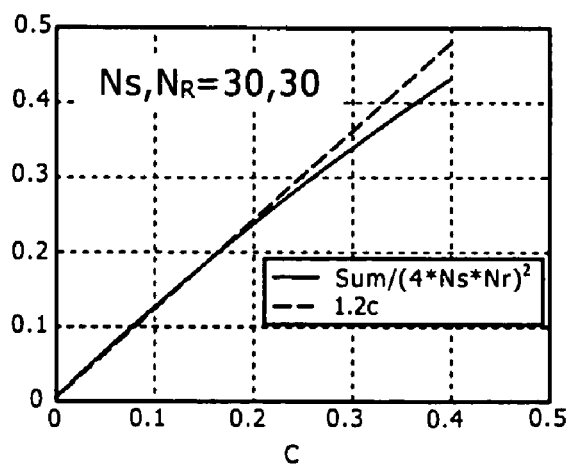

For example, if the refractive index n=2.24 (LiNb03), the wavelength $\lambda$=0.532 μm, the recording medium thickness L=1 mm, and $NA_R=NA_S$=0.5, then c=0.00477 which satisfies the condition. Some computer simulation results are shown in FIGS. 5A through 5C. FIG. 5A shows an example where $N_S$=5, $N_R$=30, FIG. 5B an example where $N_S$=30, $N_R$=5, and FIG. 5C an example where $N_S$=30, $N_R$=30.

A reproduced signal at one segment is expressed by the equation (17-1) shown below for the bit 0, and by the equation (17-2) shown below for the bit 1.

$$s_0 = \left|\sum_{j=1}^{M\hat{N}} x_j\right|^2 \qquad (17\text{-}1)$$

$$s_1 = \left|\hat{A} + \sum_{j=1}^{M\hat{N}} x_j\right|^2 \qquad (17\text{-}2)$$

where x represents a stochastic variable having random phase, where the probability that the amplitude is 1 and the probability that the amplitude is 0 are the same.

Figure 6:
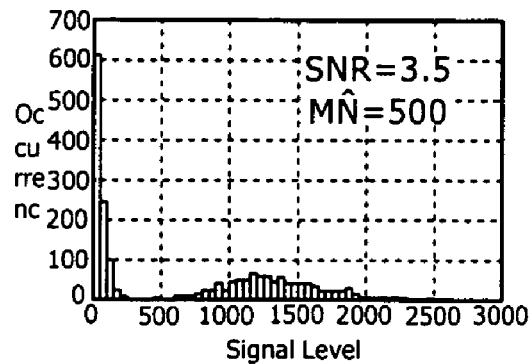
FIG. 6 is a diagram showing calculated results of reproduced signal vs. noise ratios for the hologram recording and reproducing system shown in FIG. 1.
Figure 6:
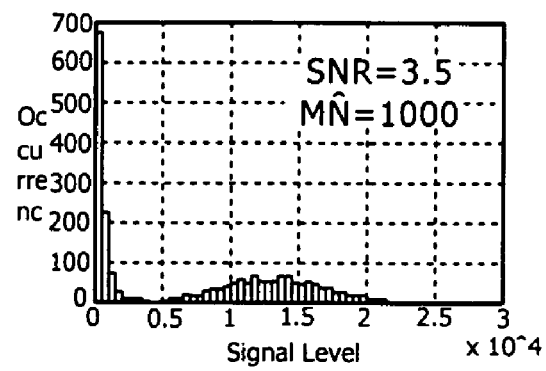
Figure 6:
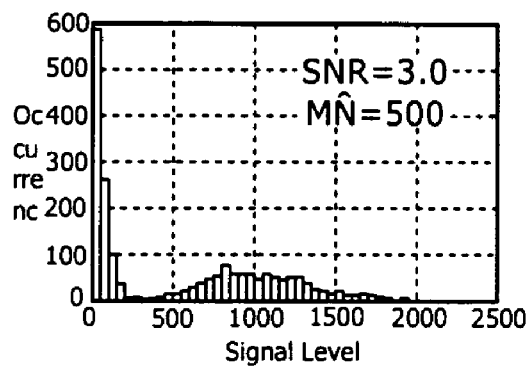
Figure 6:
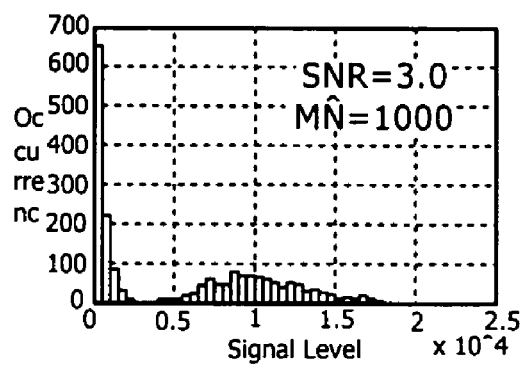
Figure 6:
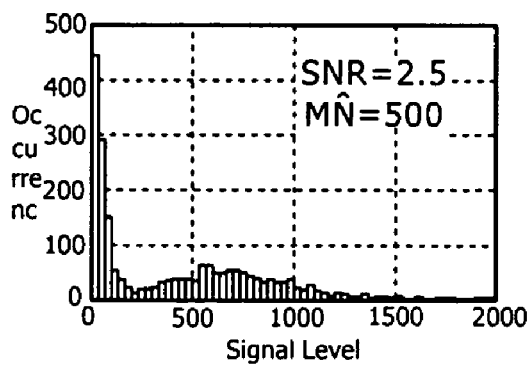
Figure 6:
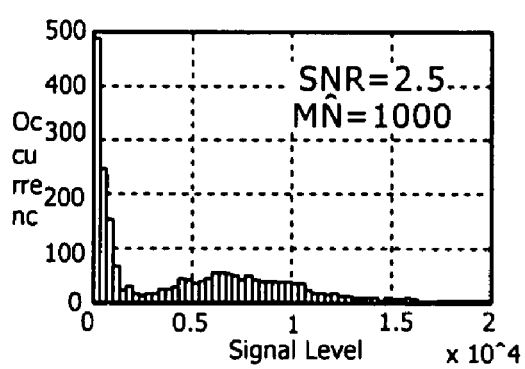
Figure 6:
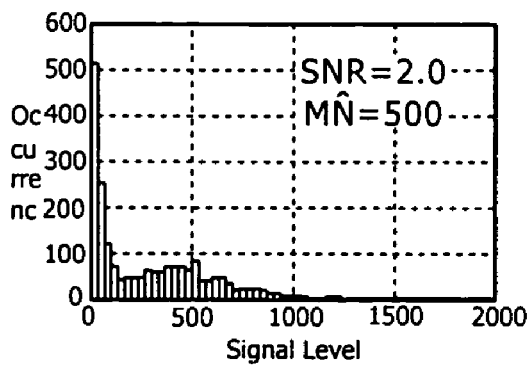
Figure 6:
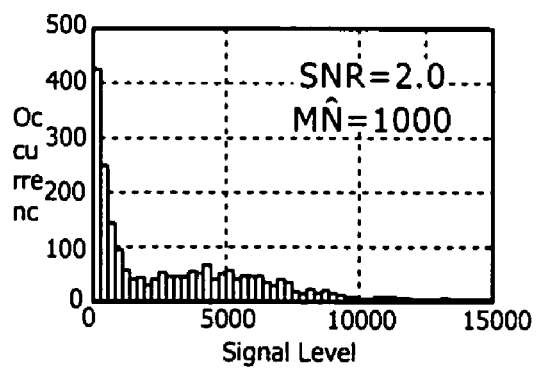

Examples of calculated reproduced signal vs. noise ratios are shown in FIG. 6. A signal vs. noise ratio (SNR) is defined by the equation (18) shown below.

$$SNR = \frac{\mu_1 - \mu_0}{\sqrt{\sigma_1^2 + \sigma_0^2}} \quad (18)$$

where $\mu_0$, $\sigma_0^2$, $\mu_1$, $\sigma_1^2$ represent averages and variances of $s_0$, $s_1$ integrated by one pixel (one bit) on the CCD 140.

As can be seen from the calculated results shown in FIG. 6, the bits 1 and 0 can be distinguished from each other if the SNR is 3 or more.

The average and variance of $s_0$ integrated by one pixel on the CCD 140 are expressed by the respective equations (19-1), (19-2) shown below, and the average and variance of $s_1$ integrated by one pixel on the CCD 140 are expressed by the respective equations (20-1), (20-2) shown below. From these equations, there is derived the equation (21) shown below.

$$K_S^2 M \hat{N} \quad (19\text{-}1)$$

$$K_S^2 \left(\frac{M\hat{N}}{2}\right)^2 \quad (19\text{-}2)$$

$$K_S^2 \left(\frac{M\hat{N}}{2} + \hat{A}^2\right) \quad (20\text{-}1)$$

$$K_S^2 \left(\left(\frac{M\hat{N}}{2}\right)^2 + M\hat{N} \cdot \hat{A}^2\right) \quad (20\text{-}2)$$

$$SNR = K_S \frac{\frac{\hat{A}^2}{M\hat{N}}}{\sqrt{\frac{1}{2} + \frac{\hat{A}^2}{M\hat{N}}}} \approx K_S \sqrt{\frac{\hat{A}^2}{M\hat{N}}} \quad (21)$$

Therefore, the following conditional equation (22) is obtained:

$$3 \le K_S \sqrt{\frac{\hat{A}^2}{M\hat{N}}} \quad (22)$$

By squaring both sides of the equation (22) and using the equations (2), (3), (14), (15), (16), the following equation (1') which is described above is obtained. At the time, the recording density is expressed by the equation (23) shown below.

$$M \le \frac{1}{2.7} \frac{S L N A_R^3 N A_S}{n \lambda^3 N} \quad (1')$$

$$D \le \frac{1}{2.7} \frac{L \cdot N A_R^3 N A_S}{n \lambda^3} \quad (23)$$

According to the present embodiment, as described above, there is provided a highly reliable, large-capacity, and high-transfer-rate hologram storage system which is capable of appropriately and easily determining the multiplexing number (the number of holograms to be multiplexed) based on the equation (1) which represents the multiplexing number M, and of guaranteeing that a signal vs. noise ratio due to crosstalk from another recorded multiplexed bit pattern when a certain bit pattern is reproduced will have a linear level of 3 or more.

The above embodiment has been described with respect to a target signal vs. noise ratio Z having a linear level of 3 or more. However, the multiplexing number can be determined by the general equation (1) even if other signal vs. noise ratios are used as a target ratio.

The general equation (1) is derived as follows:

If the signal vs. noise ratio SNR is represented by Z, then the above equation (22) is expressed by the following equation (24):

$$Z \le K \sqrt{\frac{\hat{A}^2}{M\hat{N}}} \quad (24)$$

From the above equations (14), (15), (16), the equation (25) shown below is derived. Based on the equations (13-1), (2), the equation (25) is rewritten into the following equation (26):

$$\frac{\hat{A}^2}{\hat{N}} = \frac{(2N_R)^4}{1.2c(4N_R N_S)^2} = \frac{L \cdot N A_S N A_R}{1.2 n \lambda} \frac{N_R^2}{N_S^2} \quad (25)$$

$$= \frac{L \cdot N A_S N A_R}{1.2 n \lambda} \frac{N A_R^2}{N A_S^2} = \frac{L \cdot N A_R^3}{1.2 n \lambda \cdot N A_S} \quad (26)$$

The equation (27) shown below is derived from the above equation (3), and is rewritten into the following equation (28) based on the equation (2):

$$K_S^2 = \frac{1}{N}\left(\frac{4 N A_S r_S}{\lambda}\right)^2 \quad (27)$$

$$= \frac{1}{N}\left(\frac{N A_S}{\lambda}\right)^2 S \quad (28)$$

The equation (29) is derived from the equations (24), (26), (28), and the general equation (1) is derived from the equation (29).

$$Z^2 \le K_S^2 \frac{\hat{A}^2}{M\hat{N}} = \frac{4 S \cdot L \cdot N A_R^3 N A_S}{1.2 n \lambda^3 N \cdot M} \quad (29)$$

$$M \le \frac{S \cdot L \cdot N A_R^3 N A_S}{0.3 Z^2 n \lambda^3 N} \quad (1)$$

Accordingly, depending on the required signal vs. noise ratio SNR, the multiplexing degree can easily and appropriately be determined by the general equation (1).

Although a certain preferred embodiment of the present invention has been shown and described in detail, it should be understood that various changes and modifications may be made therein without departing from the scope of the appended claims.

What is claimed is:

1. An apparatus for recording and reproducing holograms, comprising:

a recording system configured to record a light interference intensity as a refractive index change when a plurality of light beams emitted from one light source are caused to interfere with each other in a recording medium;

a reproducing system configured to read information recorded in said recording medium by detecting, with a light detector, a reproduced beam that is generated when a reference beam as a portion of divided light beams is applied to the recording medium; and a medium control system configured to move said recording medium for recording and reproducing a plurality of interference patterns when information is recorded on and reproduced from the recording medium, wherein the reference beam applied to said recording medium has an angular spectrum providing an RMS error which is 0.18 or more times the wavelength when the phase of the reference beam is fitted by a polynomial of degree four; and a number M of a plurality of multiplexed recording mediums to be recorded in a projected area S on the surface of said recording medium satisfies the following condition (1):

$$M \leq \frac{S \cdot L \cdot NA_R^3 NA_S}{0.3 Z^2 n \lambda^3 N} \quad (1)$$

where n represents the refractive index of said recording medium, $\lambda$ the wavelength in vacuum of light used to record and reproduce the information, L the thickness of said recording medium, $\pm NA_R$ the range of an angular spectrum in air of the reference beam, $\pm NA_S$ the range of an angular spectrum in air of the reproduced beam applied to the light detector, S the projected area of a recording region to be recorded in one recording cycle onto the surface of the recording medium, N the number of bits to be recorded in one recording cycle, and Z the signal vs. signal noise ratio as a target ratio.

2. An apparatus according to claim 1, wherein said signal vs. signal noise ratio Z has a linear level of 3.

3. The apparatus according to claim 1, wherein said medium control system is further configured to translate in parallel the recording medium, which comprises a flat plate.

4. The apparatus according to claim 3, wherein said medium control system is further configured to rotate the recording medium, which comprises a disk.

5. A method of recording and reproducing holograms on and from a recording medium, comprising:

recording a light interference intensity as a refractive index change when a plurality of light beams emitted from one light source are caused to interfere with each other in the recording medium;

reading information recorded in said recording medium by detecting, with a light detector, a reproduced beam that is generated when a reference beam as a portion of divided light beams is applied to the recording medium; and moving said recording medium for recording and reproducing a plurality of interference patterns when information is recorded on and reproduced from the recording medium, wherein the reference beam applied to said recording medium has an angular spectrum providing an RMS error which is 0.18 or more of the wavelength when the phase of the reference beam is fitted by a polynomial of degree four; and a number M of a plurality of multiplexed recording mediums to be recorded in a projected area S on the surface of said recording medium satisfies the following condition (1):

$$M \leq \frac{S \cdot L \cdot NA_R^3 NA_S}{0.3 Z^2 n \lambda^3 N} \quad (1)$$

where n represents the refractive index of said recording medium, $\lambda$ the wavelength in vacuum of light used to record and reproduce the information, L the thickness of said recording medium, $\pm NA_R$ the range of an angular spectrum in air of the reference beam, $\pm NA_S$ the range of an angular spectrum in air of the reproduced beam applied to the light detector, S the projected area of a recording region to be recorded in one recording cycle onto the surface of the recording medium, N the number of bits to be recorded in one recording cycle, and Z the signal vs. signal noise ratio as a target ratio.

6. A method according to claim 5, wherein said signal vs. signal noise ratio Z has a linear level of 3.

* * * * *